United States Patent Office 3,088,258
Patented May 7, 1963

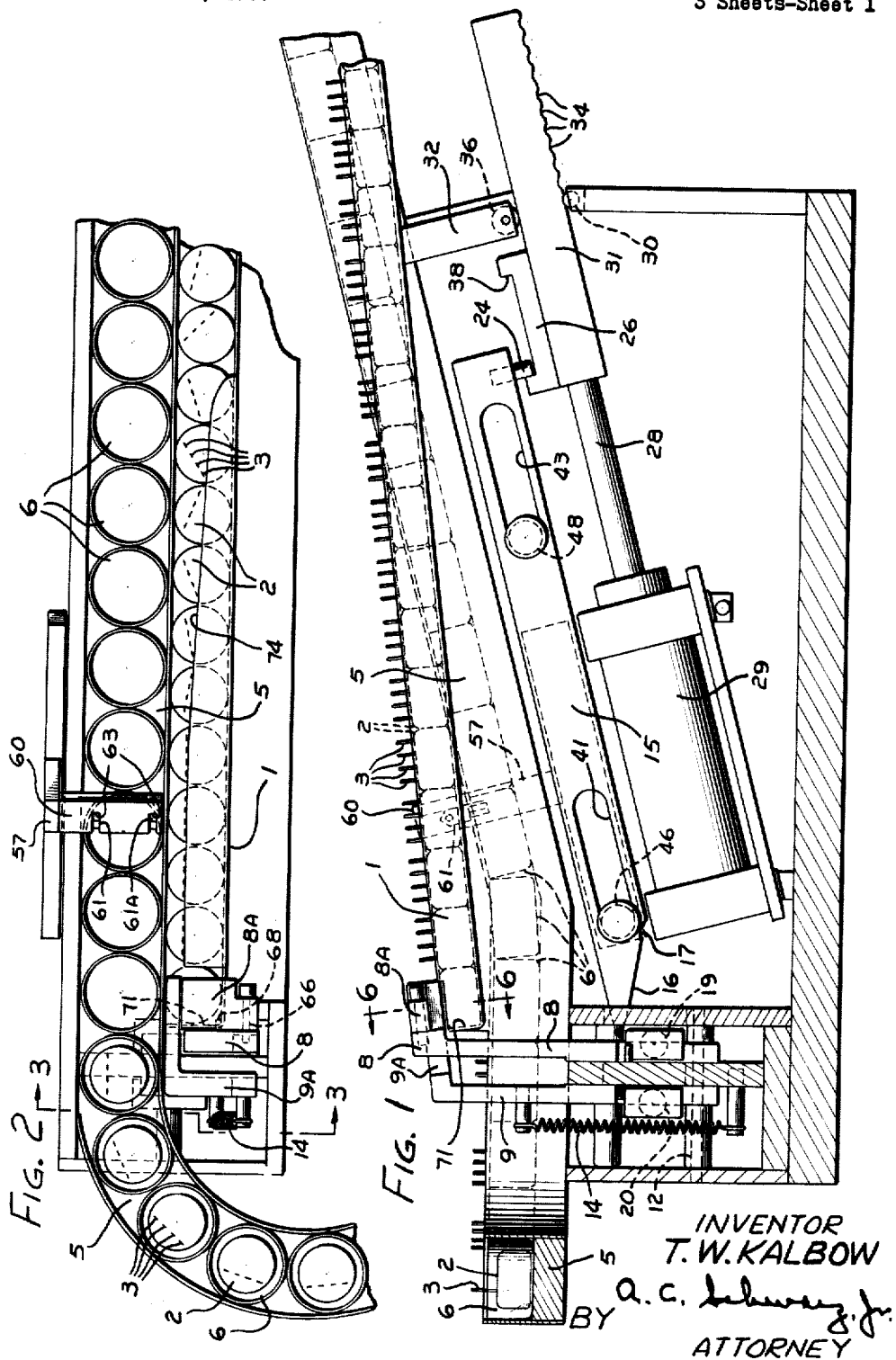

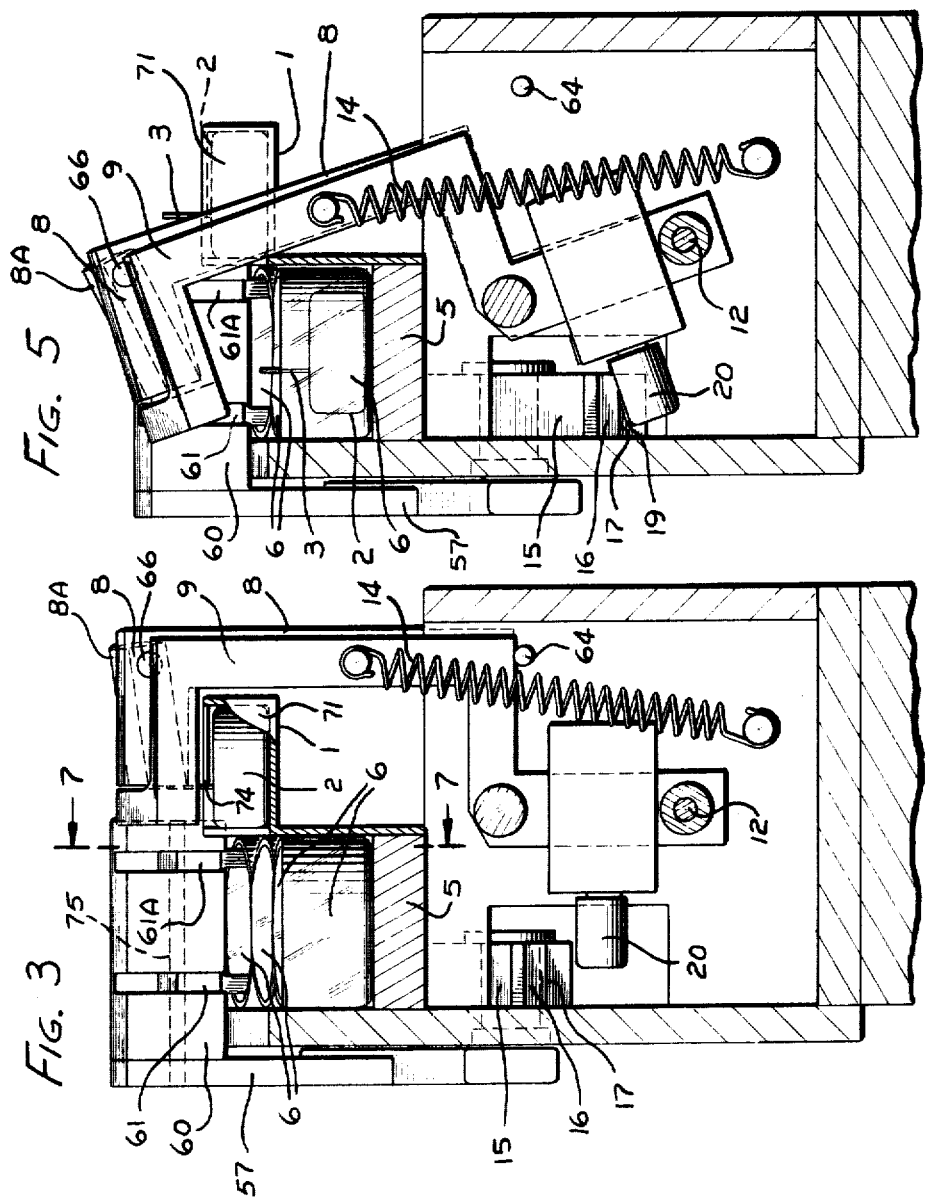

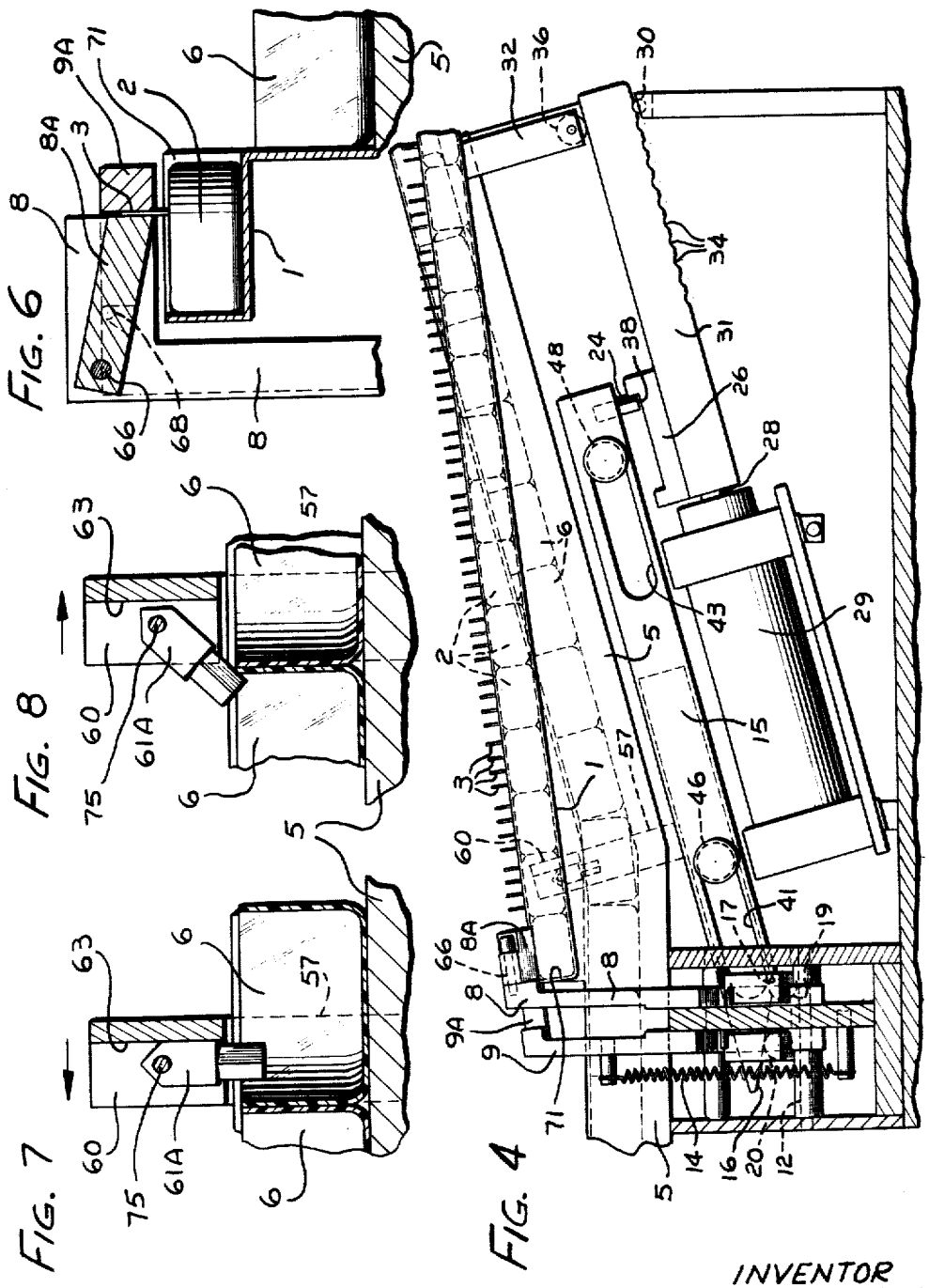

3,088,258
ARTICLE TRANSFER APPARATUS
Theodore W. Kalbow, Chicago, Ill., assignor to Western Electric Company, Incorporated, New York, N.Y., a corporation of New York
Filed Oct. 11, 1960, Ser. No. 61,929
6 Claims. (Cl. 53—251)

This invention relates to apparatus for transferring articles, and particularly to apparatus for conveying electrical units and transferring them into containers for encapsulation purposes. More specifically, the present invention relates to apparatus for transferring electrical components such as impedance units, particularly inductors, from a first conveyor into continuously moving containers on a second conveyor.

It is known to transfer articles from a first conveyor to a second conveyor, such as between a pair of chutes. However, previously known apparatus facilitating such article-transfer has been relatively complicated. Also, heretofore, it has not been possible to provide a mechanism which sequentially could cause an article to be gripped, transferred to a predetermined position, and then released while the mechanism was moving in only a single direction.

It is, therefore, an object of this invention to overcome the disadvantages hereinbefore mentioned.

Another object of the invention is to provide a simplified apparatus for transferring articles.

Still another object of the present invention is to provide an improved apparatus for simultaneously conveying and transferring articles.

A further object of the invention is to provide, in an article transfer apparatus, an actuating element which while continuously moving in a single linear direction is designed sequentially to cause an article to be gripped by the transfer apparatus, transferred to a predetermined position and finally released by the transfer apparatus.

A still further object of the invention is to provide, in an article conveying and transferring apparatus, a pivotal device to transfer articles, a reciprocating mechanism to actuate the pivotal device, and a vibrating mechanism, which is operative with the reciprocating mechanism, for urging articles toward the pivotal device.

With these and other objects in mind, the present invention contemplates a conveying and transferring apparatus for distributing, for encapsulation purposes, articles such as electrical units from a first conveyor, such as a first inclined chute, into continuously moving containers disposed in a second conveyor, such as a second inclined chute. In accordance with the invention, the second chute is horizontally spaced from and situated below the first chute.

In order to facilitate the transfer of articles between the chutes, there is provided a first pivotally mounted lever having a first article gripping finger, and a second pivotally mounted lever having a second article gripping finger. The levers are adapted for relative motion to closed and open positions whereby selectively to close and open the respective article gripping fingers so as to grip or release an article. The levers are further adapted for simultaneous movement, while the fingers thereof are together, from a position over the first or higher chute to a position over the second or lower chute.

The apparatus of the invention further contains a reciprocable sliding cam having an inclined camming surface thereon with a depression at or near one extremity of the camming surface. Upon initial movement of the sliding cam in a first direction, the inclined camming surface of the cam urges the first lever toward the second lever sufficiently that an article to be transferred is gripped between the fingers of the associated levers. Subsequent motion of the sliding cam in the same direction causes the inclined camming surface thereof to pivot both of the levers (and also both of the article gripping fingers) from a position over the first chute to a position over the second chute. This action moves the article held by the gripping fingers of the pivotally mounted levers correspondingly. At this time the depression in the inclined camming surface permits the first lever to pivot away from the second lever sufficiently that the article gripping fingers separate and the article is released into a container in the second chute.

To return the levers to their initial positions so that the associated gripping fingers may receive and transfer another article, a suitable resilient device, such as a compression spring, advantageously is secured to the second lever so as to urge the second lever towards the first lever. It is also advantageous to have the first gripping finger (i.e., the gripping finger of the first lever) adapted to pivot in an upward direction and only as the first lever is returning to its initial position so as to allow the first gripping finger of the first lever to ride up and over the next article which is to be transferred.

In another embodiment of the invention, there is provided an undulated member which reciprocates generally with the sliding cam and which transmits vibrations to one or preferably both of the inclined chutes so as to better advance articles down the chutes toward the article gripping fingers of the pivotal levers.

In still another embodiment of the invention, the sliding cam may have attached thereto a mechanism for positively advancing the containers (and/or the units to be transferred into the containers) down the associated inclined chute toward the article gripping fingers of the pivotal levers.

A complete understanding of the invention may be obtained, and other objects, advantages and novel features thereof will become apparent, by reference to the following detailed description of a preferred embodiment of the invention when taken in conjunction with the accompanying drawings, in which:

FIG. 1 is a side elevational view, partially broken away, of the apparatus of the invention with the article gripping fingers over the article chute and showing the sliding cam all of the way to the right;

FIG. 2 is a fragmentary plan view of the apparatus shown in FIG. 1;

FIG. 3 is an enlarged, fragmentary, sectional view of the pivotal levers and the article gripping fingers of the apparatus in position as shown in FIG. 1 and taken substantially on the line 3—3 of FIG. 2;

FIG. 4 is a side elevational view similar to FIG. 1 but with the article gripping fingers over the container chute and showing the sliding cam all of the way to the left;

FIG. 5 is a sectional view similar to FIG. 3, but illustrating the pivotal levers and the article gripping fingers of the apparatus in position as shown in FIG. 4;

FIG. 6 is an enlarged, fragmentary, sectional view taken along the plane of the line 6—6 of FIG. 1 and showing the pivotal mounting arrangement of the gripping finger of the first pivotal lever;

FIG. 7 is an enlarged, fragmentary, sectional view taken along the plane of the line 7—7 of FIG. 3 and showing one of the pivotally mounted container-moving pawls in position as the sliding cam is reciprocated toward the left; and FIG. 8 is a sectional view similar to FIG. 7 and showing the release action of one of the container-moving pawls in position as the sliding cam is reciprocated toward the right.

Referring now to the drawings, wherein like reference numerals designate similar parts throughout the various views, there is shown in FIGS. 1 and 2 an apparatus for transferring articles such as impedance units (e.g., loading coils) into containers for encapsulation purposes as the containers are being conveyed continuously. More particularly, the apparatus of the invention comprises a first inclined chute 1 which contains therein a plurality of loading coils 2 having a multiplicity of terminals 3 extending upwardly therefrom. There is also shown a second inclined chute 5 horizontally spaced from and situated generally below the first inclined chute 1. The second chute 5 contains therein a plurality of containers 6, each designed to accommodate a single loading for an encapsulating operation. It can also be seen from FIGS. 2 and 3 of the drawings that the first chute 1 contains a terminal-aligning projection 74 to orient the terminals 3 of the loading coils 2 so as to be in a position to facilitate the gripping and transfer thereof. In the illustrative embodiment of the invention, the loading coils 2 are placed manually in the chute 1 to the right of the projection 74, as viewed in FIG. 2, oriented in gross fashion so that the terminals 3 lie generally oriented on the opposite side of the center of each coil 2 from the projection 74 to permit the precise final orientation by the projection 74 and to prevent jamming in the chute 1.

In order to transfer the loading coils 2 selectively into the containers 6, there is provided a first pivotally mounted lever 8 having a first article gripping portion or finger 8A and a second pivotally mounted lever 9 having a second article gripping portion or finger 9A, the levers 8 and 9 (and the fingers 8A and 9A) being designed for relative motion to closed and open positions and for simultaneous movement while they are closed from a position over the first or upper inclined chute 1 to a position over the second or lower inclined chute 5. It can be seen from FIGS. 3 and 5 of the drawings that both of the levers 8 and 9 are pivotally mounted on a common axle 12, the lever 9 being urged toward the lever 8 by means of a tension spring 14.

To actuate the levers 8 and 9 (and thus the associated article gripping fingers 8A and 9A), there is provided a reciprocable sliding cam 15 containing an inclined camming surface 16 and a depression 17 at one extremity of the camming surface 16. The camming surface 16 and the depression 17 selectively engage rollers 19 and 20, carried by the levers 8 and 9, respectively, to pivot the levers 8 and 9 about the axle 12.

To facilitate the reciprocation of the sliding cam 15, there is provided at one extremity thereof a depending pin 24 which is engaged by a U-shaped member 26 attached to an arm 31 which in turn is secured to a piston rod 28 of an air cylinder 29. As shown in FIGS. 1 and 3 of the drawings, the piston rod 28 is all the way to the right with the gripping fingers 8A and 9A disposed over the loading coil chute 1, whereas, in FIGS. 4 and 5, the piston rod 28 is shown all the way to the left with the gripping fingers 8A and 9A disposed over the container chute 5. It can be seen in FIGS. 1 and 4 that the sliding cam 15 may be reciprocated to an extent as limited by slots 41 and 43 riding upon support rollers 46 and 48.

In operation, initially the piston rod 28 is all the way to the right as shown in FIG. 1 of the drawings and is in position to initiate movement to the left. As the piston rod 28 moves to the left, the arm 31, which is provided with a lower undulated surface 34 and which is attached to the right extremity of the piston rod 28, rides over a roller 30 causing the arm 31 to vibrate. This vibration is transmitted to both of the chutes 1 and 5 by having them provided with a common attached depending member 32 having a roller 36 which rides on the upper surface of the vibrating arm 31 the mounting of the chutes 1 and 5 being sufficiently flexible so as to permit the chutes to be vibrated (for example, by mounting the chute-supporting structure on bolts extending from a base plate so that the structure floats, up and down, the distance required for such vibration). Vibration causes the loading coils 2 to move in the chute 1 to the left until a first loading coil 2 is engaged by a stop 71 (FIGS. 1 and 3) whereat the first loading coil 2 is in position to be transferred from the chute 1 to the chute 5. The vibration also causes the containers 6 to advance continuously to the left in the chute 5.

As the piston rod 28 moves further to the left from the position shown in FIG. 1, an upwardly extending projection 38 of the U-shaped member 26 engages the pin 24 which is secured to the sliding cam 15. This action urges the sliding cam 15 to the left causing the camming surface 16 of the cam 15 to engage the roller 19 of the lever 8 which pivots the lever 8 toward the lever 9 until the terminals 3 of the loading coil 2 (which is touching the stop 71 in the inclined chute 1) are firmly gripped by the article gripping fingers 8A and 9A.

Further movement of the sliding cam 15 to the left causes the camming surface 16 of the sliding cam 15 to engage the roller 20 of the lever 9, the surface 16 remaining engaged with the roller 19, pivoting both the levers 8 and 9 (and the fingers 8A and 9A which are gripping the terminals 3 of the loading coil 2) in unison and in the same direction as the initial pivotal movement of the lever 8 against the action of the spring 14 until the loading coil 2 is transferred to a position over the container chute 5. At this time, the roller 19 of the lever 8 is allowed to recede by the depression 17 while the camming surface 16 continues to pivot the lever 9 in the initial direction. This allows the lever 8 to pivot sufficiently away from the lever 9 that the loading coil 2 (which is held between the gripping fingers 8A and 9A by the terminals 3) drops into the appropriate container 6 in the chute 5. Plastic, such as a thermosetting resin (e.g., melamine-formaldehyde resin) then is injected into the container 6 in a manner well known in the art so as to encapsulate the loading coil 2 except for the terminals 3 thereof.

As shown in FIGS. 3, 5, 7 and 8 of the drawings, the upper surface of the sliding cam 15 optionally may have attached thereto a supporting bracket 57 carrying an arm 60 having mounted thereon a pair of container-moving pawls 61 and 61A which are adapted to be pivoted about a pin 75 in a clockwise manner only, due to the limiting action of a pair of stops 63 on the arm 60. Therefore, while the sliding cam 15 is moving to the left, the pawls 61 and 61A engage and move a container 6 to the left as shown in FIGS. 3 and 7, whereas, while the sliding cam 15 is moving to the right, the pawls 61 and 61A ride up and over the next container 6 to be engaged by the pawls, as shown in FIG. 8, inasmuch as the stop 63 does not prevent the pawls 61 and 61A from being pivoted about the pin 75 in a clockwise manner while the sliding cam 15 is moving towards the right.

After the loading coil 2 has been released by the article gripping fingers 8A and 9A and dropped into the container 6, a timer (not shown) actuates a suitable solenoid causing the piston rod 28 to move to the right. This action moves the sliding cam 15 to the right allowing both of the levers 8 and 9 to be pivoted by the spring 14 about the axle 12 so that the gripping fingers 8A and 9A are in position over a new loading coil 2 in the chute 1. More specifically, the lever 9 is pivoted by the spring 14 only until the gripping finger 9A engages the terminals 3 of the new loading coil 2 since the lever 9 engages a stop 64 (see FIG. 3). However, as shown in FIG. 6 of the drawings, the article gripping finger 8A may pivot upwardly about a pin 66 and thus ride up and over the terminals 3 of the new loading coil 2 as the gripping lever 8 returns to its initial position. When the sliding cam 15 is moving to the left, however, a stop 68 (FIGS. 2 and 6) prevents the finger 8A from pivoting in the opposite direction during the gripping and transferring action of the lever 8 and the article gripping finger 8A.

The return of the lever 8 to its starting position is brought about by movement caused by the action of the spring 14, which urges the lever 9 towards the lever 8, and by the center of gravity of the lever 8. Alternatively, a suitable spring (not shown) may be attached to the lever 8 for returning the lever 8 to its initial or starting position.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a transfer apparatus, the combination which comprises, a first pivotable gripping lever, a roller secured to said first gripping lever, a second pivotable gripping lever, a roller secured to said second gripping lever, a reciprocable cam, and means to move said cam in a first predetermined direction and in a second predetermined direction, said cam having a first inclined camming surface and a second recessed camming surface, said first camming surface upon initial movement of said cam in said first predetermined direction engaging said roller on said first gripping lever and pivoting said first gripping lever sufficiently towards said second gripping lever that a first article is gripped between said levers, said first camming surface upon subsequent movement of said cam in said first predetermined direction also engaging said roller on said second gripping lever and thereby pivoting both of said gripping levers while they are holding said first article so as to transfer said first article to a predetermined position, said second recessed camming surface upon terminal movement of said cam in said first predetermined direction engaging said roller on said first gripping lever thereby permitting said first gripping lever to pivot sufficiently away from said second gripping lever that said first article is released in said predetermined position while said first camming surface still engages said roller secured to said second gripping lever, said cam while moving in said second predetermined direction facilitating the subsequent transfer of a second article.

2. Apparatus for transferring an article from a first station to a second station spaced from the first, which comprises: a pair of article-gripping members pivotably mounted about a common axis for independent pivotal movement, said gripping members being initially positioned in spaced relation with an article received therebetween at the first station; means for pivoting a first one of the gripping members toward the second gripping member to grip the article between said gripping members; means for pivoting the second gripping member, after the article has been gripped, in that same direction, the first gripping member continuing to pivot in that direction, so that said pair of gripping members pivot in unison with the article gripped therebetween to transfer the article to a position above the second station; and means for pivoting said gripping members relatively apart, after the article has been transferred, to release the article immediately above the second station.

3. Apparatus for transferring a succession of articles from a first conveyor to a second conveyor spaced from and below the first, which comprises: a shaft; first and second cam-operated levers mounted on said shaft for independent pivotal movement, said levers having cam-following portions and opposed article-gripping portions, the gripping portions being initially positioned in spaced relationship with an article received therebetween on the first conveyor; a single cam mounted in spaced relationship to said shaft and having an operating surface designed to engage the cam-following portions of both of said levers; actuating means for reciprocating said cam, the operating surface of said cam being designed, upon movement of said cam in a forward direction, sequentially (1) to engage the cam-following portion of the first lever so as to pivot that lever toward the second lever to grip the article between the gripping portions of said levers;

(2) to engage the cam-following portion of the second lever after the article has been gripped, said cam still being engaged with the cam-following portion of the first lever, so as to pivot both levers in unison, in the same direction that the first lever pivoted initially, with the article gripped therebetween to transfer the article to a position above the second conveyor; and (3) to permit the first lever to recede slightly in an opposite direction after the article has been transferred, while continuing to pivot the second lever momentarily in the same direction as before so as to release the article immediately above the second conveyor;

and means for returning said levers to their initial positions upon the return movement of said cam in preparation for another transfer operation.

4. The apparatus as recited in claim 3, wherein the articles are to be inserted into a succession of containers which move along the second conveyor; and wherein means are provided, operated by the movement of the cam, for positioning a container on the second conveyor beneath the article-releasing position of the gripping members so that, when each article is released by the gripping members, it falls by gravity into a properly positioned container.

5. The apparatus as recited in claim 4, wherein the positioning means includes at least one pivoted pawl; means mounted on said cam for pivotably supporting said pawl, for movement therewith, such that said pawl is disposed above the path of advancement of the containers and projects downward into that path so as to be engageable with a portion of a container; and a stop for preventing any pivoting movement of said pawl when said cam moves in the forward direction so that said pawl engages a container and pushes a container to the inserting position, said pawl pivoting up and over the container which it previously engaged as the cam returns to the initial position so as to engage the next container on the second conveyor in preparation for another cycle of operation.

6. The apparatus as recited in claim 3, wherein the article-gripping portion of the first lever is pivotally mounted on said lever for pivoting movement up and over the next succeeding article on the first conveyor as the first lever returns to the initial position thereof, and wherein a stop is provided for preventing movement of the article-gripping portion of the first lever during the transfer operation.

References Cited in the file of this patent

UNITED STATES PATENTS

| | | |
|---|---|---|
| 687,281 | Spalckhaver | Nov. 26, 1901 |
| 2,440,866 | Malhoit | May 4, 1948 |
| 2,584,466 | Kaserman | Feb. 5, 1952 |
| 2,670,090 | Crawley et al. | Feb. 23, 1954 |
| 2,804,187 | Worth | Aug. 27, 1959 |
| 3,009,299 | Mahaffy et al. | Nov. 21, 1961 |

UNITED STATES PATENT OFFICE
CERTIFICATE OF CORRECTION

Patent No. 3,088,258                                 May 7, 1963

Theodore W. Kalbow

It is hereby certified that error appears in the above numbered patent requiring correction and that the said Letters Patent should read as corrected below.

Column 3, line 13, after "loading" insert -- coil 2 --.

Signed and sealed this 3rd day of December 1963.

(SEAL)
Attest:
ERNEST W. SWIDER

EDWIN L. REYNOLDS

Attesting Officer                              Acting Commissioner of Patents